Figure 1:
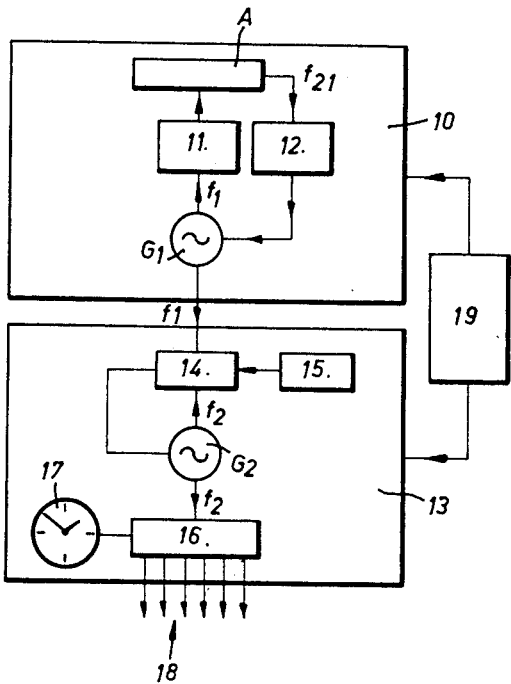

Jan. 26, 1965

P. KARTASCHOFF 3,166,888

MEANS FOR ADJUSTING A TIME-MEASURING
SYSTEM BY MEANS OF A TIME-STANDARD

Filed July 2, 1963

6 Sheets-Sheet 1

United States Patent Office 3,166,888
Patented Jan. 26, 1965

3,166,888
MEANS FOR ADJUSTING A TIME-MEASURING SYSTEM BY MEANS OF A TIME-STANDARD
Pierre Kartaschoff, Neuchatel, Switzerland, assignor to Laboratoire Suisse de Recherches Horlogeres, Neuchatel, Switzerland
Filed July 2, 1963, Ser. No. 292,428
Claims priority, application Switzerland, July 28, 1962, 9,077/62
9 Claims. (Cl. 58—23)

The perfecting of quartz-controlled clocks and chiefly the development since several years of molecular and atomic clocks relying for operation on resonant oscillations of the atoms of a molecule or on predetermined resonant frequencies of certain atoms, have allowed ascertaining with a great accuracy, the irregularities in earth's rotation, the existence of which irregularities was not previously known.

The astronomic time standard is, as well-known, provided by earth's rotation. Now the time unit constituted by one second is defined by the fact that 86,400 seconds form one mean solar day, that is the average value of one day throughout one year measured between two successive solar culminations. The time defined by the mean solar day is termed Universal Time (U.T.). The mean solar day is subjected however to very slow periodic modifications of the magnitude of a few seconds and furthermore to modifications at a higher speed of the magnitude of fractions of a second and such modifications are due to the continuous modifications of the inertia of the earth such as are produced by the North-South shifting of large ice masses.

As long as pendulum-controlled clocks were used as chronometers with an accuracy magnitude ranging between $10^{-4}$ and $10^{-5}$, such modifications of the duration of the mean solar day played practically no part. With reference however to the accuracy of the above-mentioned modern time-measuring systems, which accuracy is of a few $10^{-12}$, said modifications are considerable and require every year a correction of the definition of the mean solar day in conformity with the resonant frequency of molecular and atomic clocks.

Taking into account the modifications of the duration of the mean solar day, astronomers have already introduced, since a few years, another astronomic definition of the second which relies on the movement of the earth around the sun. This so-called Ephemeris time is subjected to substantially smaller modifications than Universal time. The second of Ephemeris time is defined as a fraction of the tropic year 1900, to wit its duration is equal to 31,556,925.974 seconds.

It is also possible to define Ephemeris time through the frequency of a molecular or atomic clock, chiefly a clock controlled by caesium, thallium, hydrogen or ammonia; starting from the above-defined second of Ephemeris time, the frequency of caesium for instance is equal to 9,192,631,770 cycles per second. Now the definition of Ephemeris time forms, by reason of the length of the observation time corresponding to the rotation of the moon round Earth during 4 weeks and to the travel of Earth round the sun during one year, a very tedious matter. The accuracy with which it has been possible to define the frequency of caesium in such astronomic time indicating systems is equal, in spite of a number of years of observation, to only about $\pm 10^{-9}$.

Now, the characteristic resonant frequency of an atomic clock is reproducible within an interval of about $\pm 5.10^{-11}$ or still less. For this reason, it has already been proposed to provide a new definition of the second relying on a characteristic atomic frequency. An International Conference on Weights and Measures will decide, in the few next years, as to the use of such a novel definition of time. In the mean time, the National Organizations of the three chief countries (Switzerland, Great Britain and the United States of America) which broadcast time signals have agreed to broadcast an Atomic Universal Time A.U.T. which is defined every year by the Universal Time of the preceding year. This definition leads to a basic frequency which is modified from year to year by a magnitude without any dimension, which is given out by the following relationship:

$$\delta = \frac{(f_{AT} - f_{UT})}{f_{AT}}$$

$\delta$ is therefore equal to the quotient of the difference between the frequencies $f$ of Atomic Time AT and of Universal Time in the preceding year divided by the frequency of Atomic Time. Thus one obtains as accurately as possible equality between Atomic time and Ephemeris time.

The difference $\delta$ during the year 1961 was equal to $$\delta = +150.10^{-10}$$

while $\delta$ was equal for the year 1962 to $$+130.10^{-10}$$

The difficulty in the technique of broadcasting time signals is due to the requirements of air and sea navigation, since only Universal time is suitable for an accurate definition of the location of a ship or of an aircraft. The necessity of providing every year a renewed correction of the fundamental frequency of a time measuring system controlled by an atomic resonator leads to substantial difficulties in the execution of an atomic clock. The yearly required corrections of frequency are of a magnitude of $10^{-8}$ and since the resonator itself has obviously a very stable frequency, it is necessary to provide frequency dividing means in the atomic clock in a manner such that small modifications in the frequency dividing ratio may be possible. The atomic frequency standards now on the market do not allow in fact any adjustment of the output frequency without the necessity of resorting to fundamental modifications in the instrument itself. In fact, it is necessary to change the synthetizer in the case of a caesium standard or the cell in the case of a rubidium standard.

On the other hand, the control of frequency dividers with a variable subdivision ratio is very intricate and liable to disturbances.

My invention has for its object to remove such drawbacks and it covers a method for adjusting a time-measuring system through the agency of a time standard, advantageously an atomic frequency standard with the possibility of matching simply and reliably the output frequency of the time measuring system with the variable frequency of Universal Time or of any other desired time definition without any large expense in execution and assembly and chiefly without any modification in the wiring diagram.

The method develops a time measuring method according to which the time standard, advantageously an atomic frequency standard, controls through its frequency $f_1$ an auxiliary clock, preferably a quartz-controlled clock oscillating at a frequency $f_2$. Said method is characterized by the fact that a comparator fed with both frequencies $f_1$ and $f_2$ compares, within a predetermined measuring period defined by the frequency $f_1$, the number of oscillations of the signal produced by the auxiliary clock at a frequency $f_2$ with an adjustable nominal value which is independent of the frequency standard and of the auxiliary clock so as to obtain an error signal for correcting the frequency of the auxiliary clock whenever a difference between the compared values appears in the comparator.

I resort advantageously to a conventional digital comparator as a comparing unit, said digital comparator being associated with a preliminary selector.

According to a further development of my invention, the measuring period is defined by the fact that a beat frequency, advantageously of a magnitude of one cycle per second, is obtained through a suitable superposition of the frequencies $f_1$ and $f_2$, the period of the impulse obtained at such a frequency forming the measuring period which latter is thus of a magnitude of 1 second.

Figure 2:
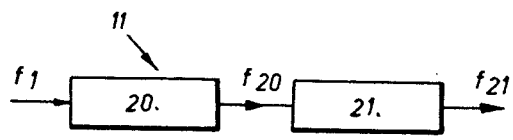
Figure 3:
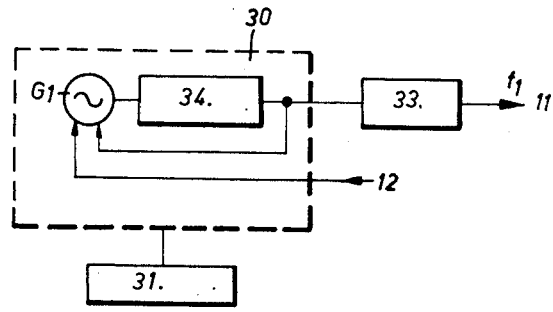
Figure 4:
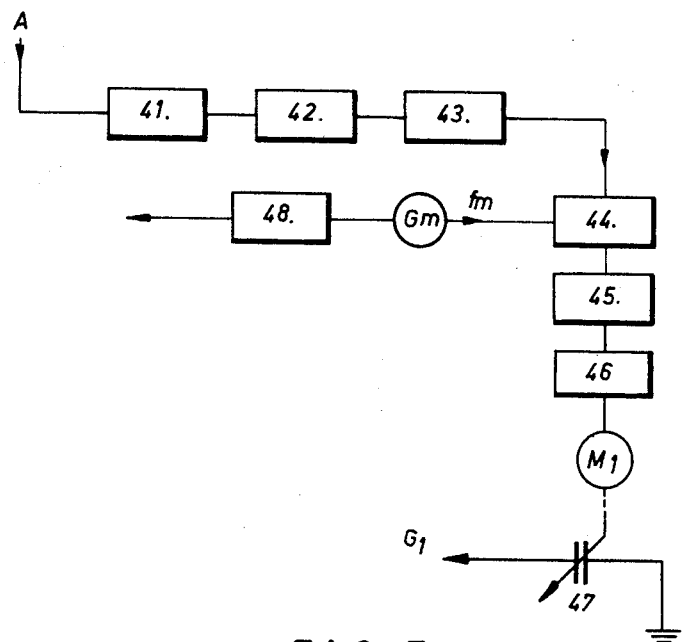
Figure 5:
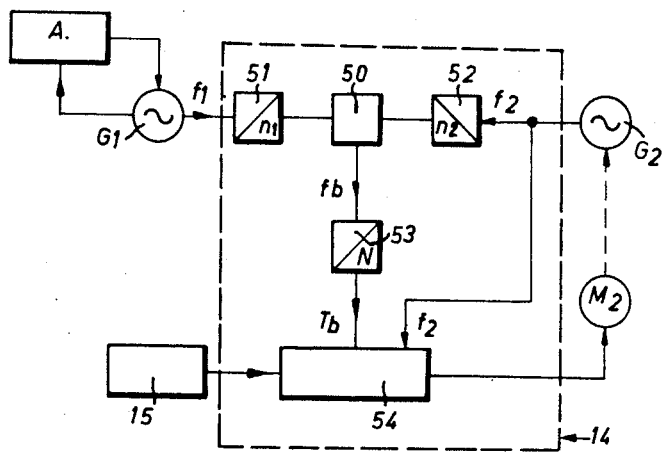
Figure 6:
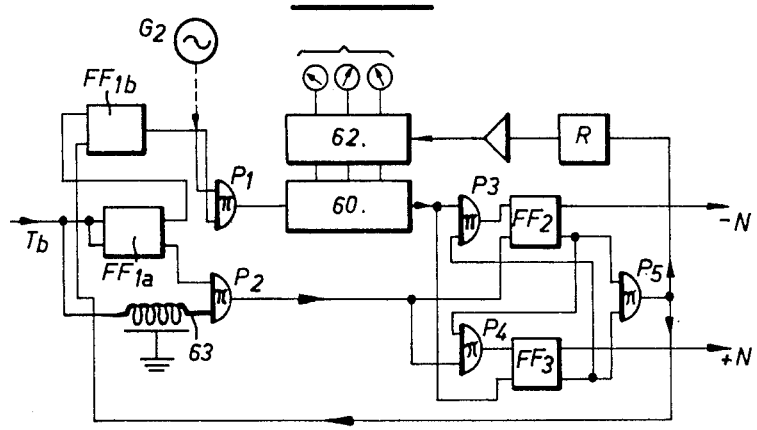
Figure 7:
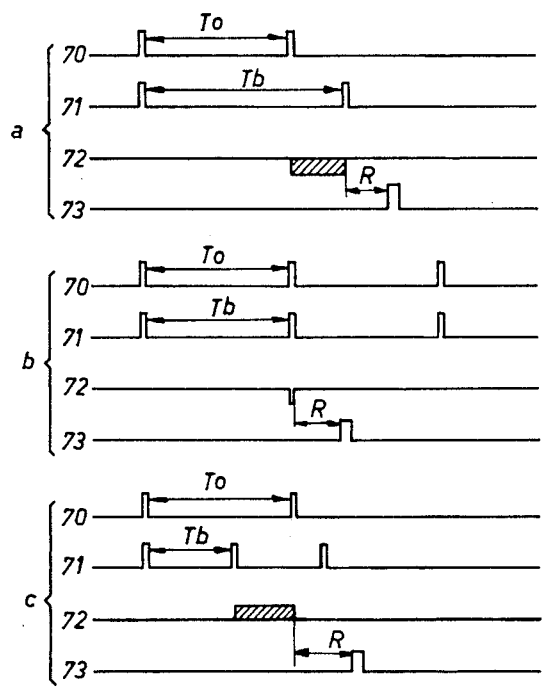
Figure 8:
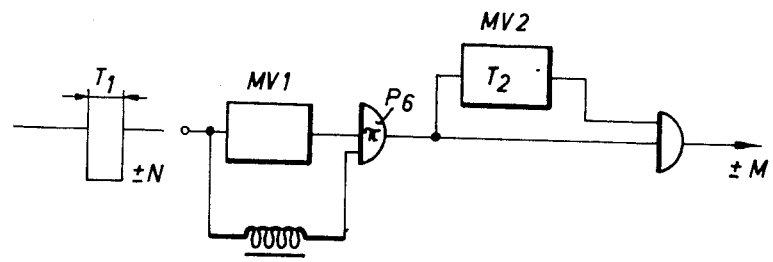
Figure 9:
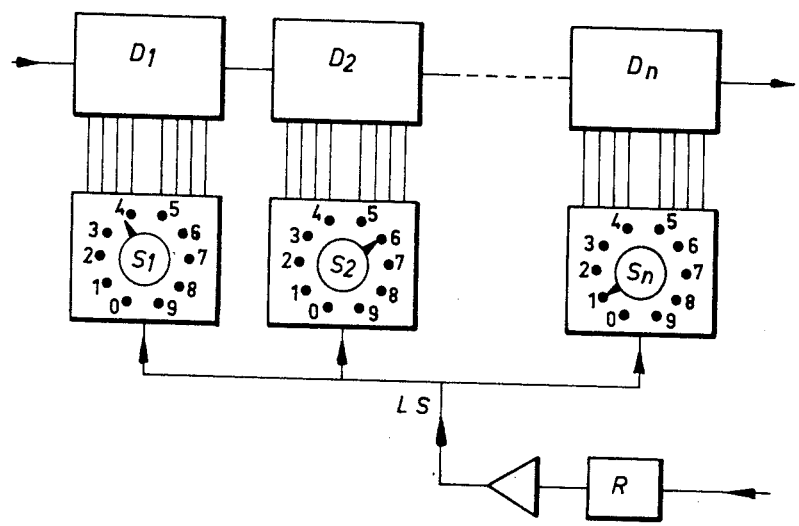
Figure 10:
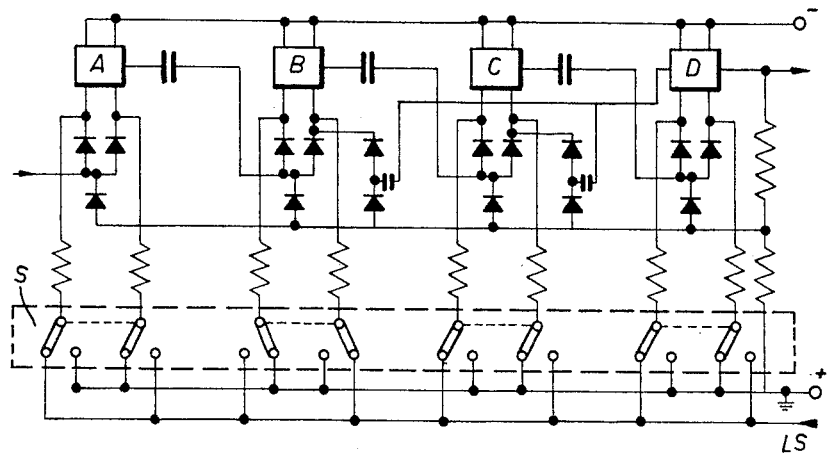
Figure 11:
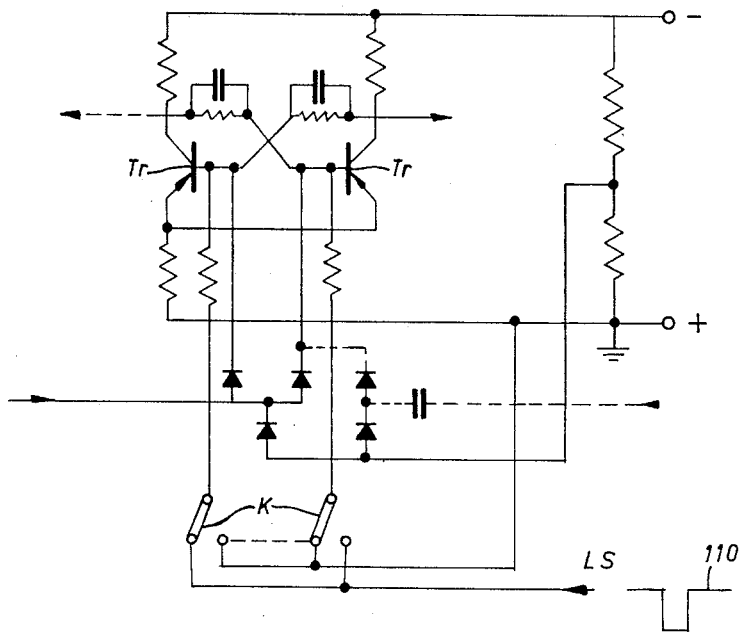
Figure 12:
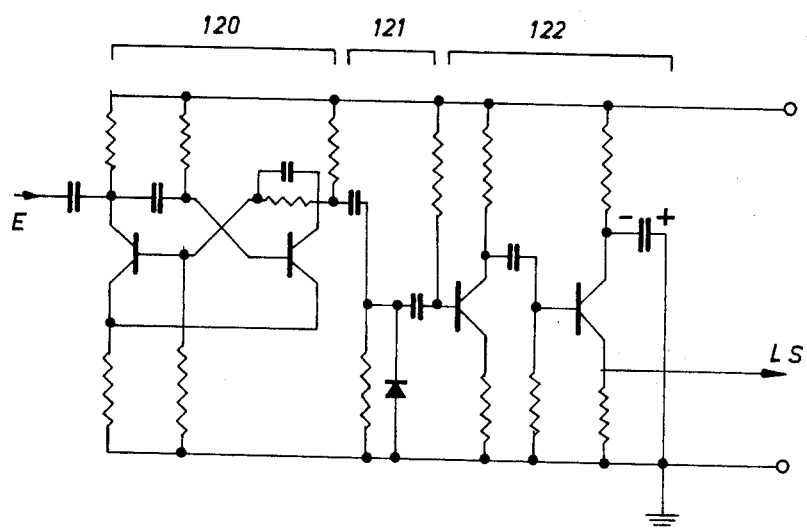

I will now disclose my invention with greater detail, reference being made to a preferred embodiment illustrated in the accompanying drawing wherein:

FIG. 1 is a block diagram of the complete measuring system,

FIG. 2 is a block diagram of the frequency multiplier for the frequency standard, FIG. 3 is a block diagram of the quartz-controlled generator provided for the frequency standard, FIG. 4 is a block diagram of the adjusting means for said frequency generator, FIGS. 5 and 6 are block diagrams of the digital comparator, FIG. 7 is a chart showing the impulses produced, FIG. 8 is a block diagram showing the adjusting means for the auxiliary clock, FIG. 9 is a block diagram of the preliminary selector for the digital comparator, FIG. 10 is a wiring diagram of the counter decade scaler associated with a preliminary selector, FIG. 11 is a wiring diagram of a binary counting stage forming part of the decade scaler of FIG. 10, FIG. 12 is a wiring diagram illustrating the selective production of impulses.

The time-measuring system for the execution of my improved method includes, as illustrated in FIG. 1, three main sections, to wit: the atomic frequency standard 10, an auxiliary clock 13 adjusted by said frequency standard and operating with a quartz-controlled oscillator $G_2$ and finally a unit 19 supplying current to the complete system.

The general principle of time measurement and also of matching of the output frequency of the auxiliary clock 13 with a predetermined time definition, consists in that there is produced a beat frequency in the unit 14 forming part of the auxiliary clock 13 and cooperating with a digital comparator, said beat frequency being produced through a suitable superposition of the frequency $f_1$ of the atomic frequency standard and of the frequency $f_2$ of the quartz-controlled oscillator $G_2$; this being done, there is counted within the time interval defined by said beat frequency the number of impulses corresponding to the frequency $f_2$ and said number of impulses is compared with the reference impulse number adjusted by the preliminary counter 15 of the auxiliary clock. Upon appearance of a difference between the two numbers of impulses, the frequency $f_2$ of the quartz-controlled oscillator $G_2$ is caused to vary under the action of a suitable adjusting member until disappearance of said difference between said impulse numbers is obtained. Thus, on the one hand, the output frequency $f_2$ which serves for controlling time-indicating means is maintained as a predetermined unvarying fraction of the frequency $f_1$ of the atomic time standard, while, on the other hand, the adjustable preselected reference impulse number or the nominal reference value allows an accurate adjustment of the frequency $f_2$ in accordance with the Universal Time as corrected every year. This allows the time measuring system according to the invention, to produce an accurate matching at every moment between Atomic time supplied by an atomic frequency standard and Universal time obtained through astronomic observations.

The output frequency $f_2$ of the auxiliary clock which is adjusted by the atomic frequency standard is fed to a frequency subdivider 16 of a conventional type, to which are connected on the one hand a synchronous clock 17 controlled by the auxiliary clock and on the other hand the output terminals 18 from which it is possible to tap off in the usual manner the standard frequencies: 1 megacycle, 100 kilocycles, 10 kilocycles, 1 kilocycle, 50 cycles and 1 cycle.

The atomic frequency standard 10 illustrated in FIG. 1 is constituted by the following structural units:

A resonance tube A of the caesium type or any other known molecular or atomic resonator, a quartz-controlled generator $G_1$ for the production of the microwaves energizing the caesium resonator, a frequency multiplier 11 and also means 12 for adjusting the frequency of the quartz-controlled generator $G_1$.

The common feed unit 19 (FIG. 1) is constituted by a storage battery feeding a voltage of 24 volts, which battery may be charged through a rectifier and a self-adjusting charging device.

The structure and the operative conditions of the atomic resonator are well-known and need not be described in the present specification.

The frequency multiplier 11 is advantageously designed in a manner such that it may operate for input frequencies ranging between 5 and 10 megacycles and it is subdivided into successive stages in which the sole multiplying coefficients are equal to 2 or to 3 with a view to obtaining an optimum efficiency.

The embodiment illustrated resorts to the use of a caesium resonator having a resonance frequency $$f_{21}=9{,}192{,}631{,}770 \text{ cycles}$$

and the total multiplying coefficient provided by the frequency multiplier 11 is chosen as equal to $1{,}458=2\times 3^6$. This produces a frequency $f_1$ for the quartz-controlled generator $G_1$ which is equal to $f_1=6{,}304{,}960.0617$ cycles.

Assuming the multiplying coefficient is equal to 3 for each stage of the frequency multiplier 11, the following intermediate frequencies are obtained:

$f_1=6{,}304.9$ kilocycles
$3f_1=18.914$ megacycles
$9f_1=56.744$ megacycles
$27f_1=170.233$ megacycles$=f_{20}$
$81f_1=510.700$ megacycles
$243f_1=1{,}532.105$ megacycles
$729f_1=4{,}596.316$ megacycles
$1458f_1=9{,}192.632$ megacycles$=f_{21}$ The seven stages required for the frequency multiplication are subdivided into two groups as illustrated in FIG. 2. The first group designated by 20 is constituted by three trebling stages in push-pull relationship and fed with high frequency transistors, which stages transform the input frequency $f_1$ into the intermediate frequency $f_{20}=170.2$ megacyles. In order to obtain a sufficiently high output yield for the 170 megacycle signal, it is of advantage to provide an intermediate amplifier which does not modify the frequency ahead of the transfer of the intermediate frequency signal $f_{20}$ into the second multiplying group 21. Said second group includes four stages provided with varactors which form said resonance frequency $f_{21}$ of the caesium resonator as an output signal.

The connections of the quartz-controlled generator $G_1$ are illustrated diagrammaticaly with further detail in FIG. 3. In order to produce a frequency $f_1$ of 6,305 kilocycles, it is of advantage to resort to a conventional quartz having an A.T.-cut. The quartz-controlled generator should show a very high stability as to frequency at least within a short period. To this end, it is associated as shown in FIG. 3 with a high grade theromostat 30, since even reduced modifications in temperature of a magnitude of only a few thousandths of a degree per minute, can act detrimentally on the transient stability of the quartz.

The adjustment of the quartz-controlled generator is obtained in the usual manner through proportional adjusting means 31 constituted preferably by a small transistorized time-measuring device of a known type. The output signal of the quartz-controlled generator $G_1$ is fed, through an arrangement 34 of a known type adapted to stabilize the amplitude of the quartz oscillations, to an output amplifier 33 matching the input of the frequency multiplier 11.

The frequency adjusting device 12 for the quartz-controlled generator is illustrated with further detail in FIG. 4.

The output signal of the caesium tube A is fed to a preliminary amplifier 41 which has an input impedance of one megohm and also a low accustic level. The filter 42 fed by said preliminary amplifier cuts out the second harmonic $2f_m$ of the modulating signal supplied by the modulating generator $Gm$, which harmonic appears as a consequence of the curvature of the maximum of the resonance line at the output end of the resonant tube. Said component of the modulating signal can produce a systematic defect in the adjustment when the symmetry of the phase detector 44 is imperfect.

The A.C. voltage at the frequency $f_m$ at the output of the filter forms the defects signal (error signal) and is fed to the amplifier 43 tuned to the modulating frequency for the production of a good ratio between signal and background noise. The defect signal thus amplified is fed into the phase detector 44 constituted by an annular modulator comprising four diodes. The symmetry of said phase-detector is adjustable and should be as stable as possible. A compensation filter 45 which serves for the maintenance of the stability of the adjusting means provides for the transmission of the output signal of the phase detector into a control amplifier 46 of which the output current is sufficient for the actuation of an adjusting motor $M_1$.

This adjusting motor is advantageously constituted by a small D.C. motor of a known type which controls through a transmission gear producing a speed reduction of say 100:1 the adjustable condenser 47. Through the agency of said variable condenser 47, the frequency $f_1$ of the quartz-controlled generator $G_1$ is adjusted. The range of adjustment of all the adjusting means should be large enough for it to extend beyond the possible modifications which may appear in the quartz-controlled generator during a period of observations as a consequence of the ageing of the quartz. This cuts out the necessity of a readjustment during the observation period.

The frequency generator $Gm$ which serves for producing the modulating frequency $f_m$ is of a known type and may supply for instance frequencies between 100 and 250 cycles. Frequencies of say 110 or 220 cycles may be selected for instance as modulating frequencies $f_m$. It is possible to adjust the phase of the modulating signal through the phase shifting means 48, in order to compensate for the phase shifting in the resonant tube or in the amplifying units.

FIG. 5 is a block diagram illustrating the comparison between the two frequencies $f_1$ and $f_2$ together with the production of the beat frequency $f_b$. The units designated as 50, 51, 52, 53, 54 in FIG. 5 belong to the digital comparator designated by the reference 14 in FIG. 1. Inside the frequency multiplying unit 51, the frequency $f_1$ supplied by the atomic frequency standard, is multiplied by the coefficient $n_1$, while the frequency $f_2$ supplied by the quartz-controlled generator $G_2$ of the auxiliary clock is multiplied in the frequency multiplier 52 by the coefficient $n_2$. The multiplying coefficients $n_1$, $n_2$ are selected in a manner such that a subtraction between the two multiplied frequencies produces in the unit 50, a low beat frequency $f_b = n_1 f_1 - n_2 f_2$.

In the subdividing unit 53, said frequency $f_b$ is subdivided again by a coefficient N. Said coefficient N is selected in a manner such that the output signal produced by said subdividing unit 53 and which is fed to the actual digital comparator 54, has a period equal to $$T_b = N/f_b \text{ or approximately 1 second}$$

This period $T_b$ is measured now through digital means wherein a counter incorporated with the comparator unit 54 and which is fed by the frequency $f_2$ supplied by the quartz-controlled generator $G_2$ as a counted frequency counts the number of oscillations of the $f_2$ signal between two successive impulses of the beat signal. This result formed by the counter is compared in a manner disclosed with further detail hereinafter with a nominal or reference value which may be adjusted in the preselecting unit 15. Whenever a difference arising between said nominal value and the measured number of impulses which is obtained during the period $T_b$ is ascertained, in this case said difference serves in a conventional manner as a defect signal adapted to control an adjusting motor $M_2$ which corrects the frequency $f_2$ of the quartz-controlled generator $G_2$ through a shifting of a corresponding adjusting member, this procedure continuing until the discrepancy has disappeared. The correction of the frequency $f_2$ through the agency of the adjusting motor is executed advantageously in the same manner as the above-described adjustment of the quartz-controlled oscillator $G_1$ of the atomic frequency standard, through an adjustable condenser which forms part of the oscillating circuit of the quartz-controlled generator $G_2$. The movement adjusting the condenser is performed through a speed-reducing gear.

The adjustment of the frequency of the quartz-controlled generator $G_2$ corresponds thus in principle to the adjustment of the quartz-controlled oscillator $G_1$ of the atomic frequency standard. The frequency subdividing means and the output amplifiers are of a conventional structure.

The quartz-controlled generator $G_2$ should be of the grade of a good quartz-controlled clock. The use of a frequency $f_2$ of one megacycle allows obtaining a good transient stability. With a view to avoiding too frequent readjustments of the quartz generator, the modification of the quartz with age should not rise beyond a value of $10^{-9}$ per day. A readjustment is required only when the limit disclosed hereinafter of the contemplated adjustable range for the nominal value has been overstepped.

When the period $T_b$ has been made equal to the preselected nominal value in the manner disclosed, then the frequency $f_2$ is in an accurate well-known and well-defined ratio with reference to the frequency $f_1$ of the atomic frequency standard. The output frequency $f_2$ of the complete time-measuring system is thus adjusted by the accurate frequency $f_1$ of the atomic time standard. At the same time however, it is possible to adjust in the preselecting unit 15 a nominal value which may differ from case to case so as to suit the varying definitions of Universal Time.

As a numerical example, the frequency of the atomic frequency standard, may be equal to $f_1 = 6{,}304{,}960.0617$ cycles, the frequency of the auxiliary clock $f_2 = 1$ megacycle while the multiplying coefficients are then selected as $n_1 = 20$ and $n_2 = 126$. The multiplication of the frequency $f_2$ is then obtained in four stages since $$n_2 = 2 \times 3 \times 3 \times 7 = 126$$

The last factor 7 is obtained by means of a diode.

The diode is finally subjected to the action of a modulating signal equal to 100 kilocycles so that the frequency is increased by said amount of 100 kilocycles. Thus, there are obtained $n_1 \times f_1 = 20 f_1$ and $$n_2 f_2 + 0.1 = 126.1 \text{ megacycles} = \nu_0$$

With such values, there is obtained in the mixing unit 50, the following beat frequency $$f_b = n_2 \times f_2 + 0.1 - n_1 \times f_1 = 798.8 \text{ cycles} = f_b$$

Lastly the frequency $f_b$ is divided by the coefficient $N = 1000$. This produces a period $T_b \approx 1.25$ second for the sequence of beat impulses.

The possible discrimination or resolution is as follows $$\Delta \nu / \nu_0 = (N/T_b^2) \times (\Delta T_b / \nu_0)$$

$\Delta \nu / \nu_0$ designates the modification in frequency for a modification of the last digit of the counter number by one. Since the frequency of the counted impulses is equal to one megacycle, $T_b = 10^{-6}$ second. With $$\nu_0 = 126.1 \times \nu_0 \times 10^{-6} \text{ cycles}$$

there is obtained a discrimination of $5.05 \times 10^{-12}$.

It is now desirable for the nominal value $N_0$ which is adjustable in the preselecting unit 15, to be adjustable within a range of $\pm 5 \times 10^{-8}$; this means that said nominal value $N_0$ should be allowed to vary by $\pm 10^{-4}$ units. The preselection unit is consequently provided with five variable selector decade scalers, with an unvarying preliminary decade scaler forming the digit 2 and with a conventional decade scaler. With such an arrangement, it is possible to adjust a nominal value $T_0$ for the period of the beat frequency which value can be selected within the range $1.200000s < T_0 < 1.299999$. Consequently the comparator supplies for the nominal value, a range of adjustment extending altogether over $5 \times 10^{-7}$, which satisfies the requirement for a range of adjustments of $\pm 5 \times 10^{-8}$.

A remark should also be made as to the errors in the quartz generator. Since it is possible to control the counter means and the frequency multiplying and subdividing means in a manner such that their errors may be smaller than the variations in the frequency of the quartz-controlled generator, the limit error of the total comparator system is given out by the transient variations of the quartz. In the case of the present day available oscillators, the relative dispersion of frequency is equal to about $$\sigma \nu \approx 3 \times 10^{-11} / \sqrt{T_m}$$

where $T_m$ designates the duration of observation in seconds. This value defines the stability of the atomic frequency standard, which stability ensures in its turn the stability of the frequency $f_2$ of the auxiliary clock.

FIG. 6 is a block diagram of the digital comparator and the operation of the latter will now be disclosed with further detail, reference being made to said figure.

The impulses, to be measured within the period $T_b$ which is that of the beat signals produced, control through the flip-flop stages $FF_{1a}$ and $FF_{1b}$ the opening of the gate $P_1$ which provides a passage for the counted signals at a frequency $f_2 = 1$ megacycle out of the generator $G_2$ towards the counter 60. Said counter is first adjusted through the preliminary selector 62 to the complementary value $\bar{N}_0$ of the selected nominal value $N_0$. When the counted number of impulses has reached said nominal value $N_0$, an impulse appears at the output end of the counter 60.

According to the duration of $T_b$ with reference to the nominal value $T_0 = N_0/10^{-6}$, it is possible to distinguish three different cases as illustrated in FIG. 7.

(a) $\qquad T_b > T_0$

The counter 60 supplies an output pulse before the end of the period $T_b$ is reached. This output signal is fed through the gate $P_3$ to the bistable multivibrator $FF_2$. This multivibrator precedingly set to provide a zero output is now shifted into its other condition and provides the output signal "1" which is fed to the output terminal $-N$. Said output signal controls the adjusting motor $M_2$ in a direction leading to a shortening of the period $T_b$.

At the end of the period considered $T_b$, the next pulse passes through the gate $P_2$ to the multivibrator $FF_2$ and sets the latter back into its zero condition, whereby the adjusting motor is stopped. The gate $P_4$ is open only when the multivibrator $FF_2$ is in its zero condition and consequently the multivibrator $FF_3$ is not controlled by the above-mentioned pulse passing through the gate $P_2$. The shifting of the multivibrator $FF_2$ into its zero operative condition produces two results: the multivibrator $FF_{1b}$ which fed hitherto an output signal "1" is now shifted back into its zero condition through the gate $P_5$ whereby it closes the gate $P_1$ and the counter is stopped. Furthermore the delaying means R feed a pulse to the preliminary selector unit 62 so that the number $\bar{N}_0$ corresponding to the selected nominal value is fed again into the counter 60. Thus, the original output condition is restored and a new comparing cycle can start.

(b) $\qquad T_b = T_0$

The counter 60 produces an output pulse registering with a further input pulse, that is exactly with the end of the period to be measured $T_b$. Said input pulse is however delayed by the delay line 63 by 0.5 microsecond. Thus, the multivibrator $FF_2$ remains only during 0.5 microsecond in its operative condition "1." This duration is however not sufficient for energization of the adjusting motor. Obviously however the gate $P_1$ closes again and the preliminary selection is again performed as in the case (a).

(c) $\qquad T_b < T_0$

The following input impulse appears now before the counter 60 has produced its output signal. This second input impulse shifts the multivibrator $FF_3$ through the multivibrator $FF_{1a}$ into the condition "1." This results in the production of an output pulse in the output terminal $+N$ whereby the adjusting motor is controlled in a direction corresponding to an increase of $T_b$. When the counter 60 supplies then, after the expiry of the period $T_0$, an output signal, the multivibrator $FF_3$ is again returned into its zero condition and the motor stops. The closing of the gate $P_1$ and the readjustment of the preliminary selection are performed as in the case (a).

The three above-referred to possible cases (a), (b) and (c) are illustrated diagrammatically in FIG. 7. The time scale 70 gives out the nominal values $T_0$ and the impulses produced through the superposition of frequencies are illustrated within the period to be measured $T_b$ on the time scale 71. The time scale 72 illustrates the output pulses reaching the terminals $-N$ and $+N$ (FIG. 6) which pulses control the adjusting motor $M_2$ as shown in FIG. 5, while the impulses producing the preliminary selection, are shown on the time scale 73. By reason of the delaying means R (FIG. 6), the last-mentioned impulses are delayed with reference to the moment of the stoppage of the adjusting motor by a duration R.

FIG. 8 is a rough wiring diagram for the adjusting motor $M_2$. In accordance with the above disclosure, the motor is driven only during a period $T_1 = [T_0 - T_b]$. The monostable multivibrator $MV_1$ ensures, when an impulse $T_1$ has entered it, the locking of the gate $P_6$, during 1 microsecond. Thus, an input impulse $T_1$ can actuate the adjusting motor only when its duration is longer than the duration of locking of the gate $P_6$, that is when said duration is above 1 microsecond.

In this case, that is when $T_1$ is longer than 1 microsecond, the gate $P_6$ opens after 1 microsecond, so that the multivibrator $MV_2$ is energized and supplies an output impulse of a duration $T_2$. This latter output impulse controls the amplifier which is not illustrated and which feeds the adjusting motor, said amplifier being constituted, for instance, by a conventional bridge carrying four transistors. The input signals for said amplifier are symbolically shown in FIG. 8 by $\pm M$. The duration of the impulse $T_2$ is adjusted through the fact that the motor executes one correcting movement corresponding to a modification of the last counted number by one unit.

Now, if the input impulse $T_1$ is longer than the duration of the impulse $T_2$, the multivibrator $MV_2$ remains energized even after the end of the period $T_2$ so that the motor is driven during said period $T_1$, whereby the correcting operation cutting out the defect is sped up.

The connections according to FIG. 8 are provided in each output circuit −N and +N of FIG. 6 so that, according to the sign assumed by the difference $T_1=T_0-T_b$, the adjusting motor is driven into one direction or the opposite direction.

The connections for the preliminary selector with a view to adjusting the nominal value in the counting system are well-known per se, but it will now be disclosed with further detail for sake of completeness. The counter illustrated in FIG. 9 is constituted by a chain of decade scaler blocks $D_1 \ldots D_n$. The block $D_1$ counts the units, the block $D_2$ the tens, and so on.

Before the beginning of each counting unit, all the decade scaler blocks are set through the agency of the corresponding selectors $S_1 \ldots S_n$ to the desired nominal value. Any re-adjustment of said nominal value after a counting cycle is performed, as already disclosed, through the agency of the signal fed through the line LS by the delaying means R. FIG. 10 shows the principle of a preselecting decade scaler. According to this known principle, the decade scaler is constituted by a chain of four binary stages A, B, C, D. Suitable return connections between the stage D and the stages B and C allow cutting out six of the possible sixteen counter conditions, which six conditions are not in fact required for a decadic counting operation. Thus, a complete counting cycle is executed with ten impulses. Each of the digits 0 to 9 corresponds in a known manner to a univocal combination of the conditions of the four binary stages.

In order to allow the preliminary selection, each of the binary stages is equipped with two auxiliary inputs connected with the selector S. This selector S defines through its position the condition of the binary stages as controlled by the preliminary selecting pulses fed over the line LS.

FIG. 11 is a wiring diagram of a binary stage provided with preliminary selecting means. A switch K connects the line LS selectively one of the two inputs of the preliminary selecting means with ground, while the other input is connected with the line LS. In the absence of any preliminary selecting impulse, said line is also at ground potential. Under such conditions, the binary stage operates in a conventional manner. The preliminary selection is executed now through a negative impulse of about 6 volts, the duration of which is about 1 microsecond, fed by the line LS. Said impulse reaches the base of one of the two transistors $Tr$ of the binary stage and it sets the corresponding transistor in a conductive condition.

According to a practical embodiment, the system illustrated in FIG. 10, of which a switch K is illustrated in FIG. 11 is constituted by a common selector of a known type through the agency of which it is possible to obtain in a single operation, a digit previously selected out of the digits 0 to 9.

When the decade scaler has been adjusted previously, for instance so as to show the digit 3, the output impulse is produced after seven input pulses. This being done, the decade scaler operates after the manner of an ordinary decade scaler, that is the output impulses are fed after 17, 27, 37 . . . input pulses.

A system of $n$ preselected decade scalers adjusted for a number $\overline{N}_0$ within the range $$0<\overline{N}_0<10^n-1$$

supplies a first output pulse when the number of input pulses has reached the value $N_0=10^n-\overline{N}_0$ The preliminary selecting pulse is produced by a wiring diagram of the type illustrated in FIG. 12. Said wiring diagram contains a monostable multivibrator which supplies a delayed signal, and also a differentiating circuit and an amplifier having a small output impedance. The impulses entering the input terminal E are fed at the output end into the above-mentioned line LS.

My invention is obviously not limited to the above-described embodiments. The production according to the invention of the beat frequency through the association of the two frequencies $f_1$ and $f_2$ in the digital comparator is applicable to resonators, oscillators and time measuring instruments of any type. The atomic time standard can operate with any known molecular or atomic resonator, or with a quartz-controlled oscillator. Similarly, the quartz-controlled generator in the auxiliary clock may be replaced by any other known frequency generator.

The method according to the invention for the transformation of the frequency $f_1$ so as to control the frequency $f_2$ and for the accurate adjustment of the frequency $f_2$ in accordance with Universal Time which is defined anew from time to time, cuts out the complicated and expensive syntheses resorted to hitherto and also the readjustments of the output frequency requiring intricate modifications in structure.

Furthermore, the method according to the invention can be executed with a digital comparator of a type well-known per se and the treatment of the signals requires the use only of logical structural units available in trade and which, as well-known, are entirely reliable during operation. At the same time, the exclusive use of standard structural elements reduces substantially the expense of a time-measuring and comparing system operating in accordance with my improved method, as compared with the prior known arrangements. Lastly, it is possible according to my invention, to maintain constancy of the output frequency with an accuracy within $\pm 10^{-11}$.

What I claim is:

1. In time-keeping apparatus, the combination of an atomic frequency standard producing a selected stabilized frequency $f_1$, a variable frequency oscillator producing a frequency $f_2$ which is lower than $f_1$, mixing means for comparing a function of the output frequency $f_1$ of said atomic frequency standard and a function of the output frequency $f_2$ of said oscillator to produce a beat frequency $f_b$, a digital comparator comprising a digital counter and gate means controlled by said beat frequency $f_b$ to feed said frequency $f_2$ of said oscillator to said counter for a period $T_b$ equal to a function of the period between successive impulses of said beat frequency $f_b$, preselecting whereby the impulses of said frequency $f_2$ are counted during the period $T_b$, preselecting means for supplying to said comparator a selected reference value, said comparator comprising means for comparing the number of impulses of the frequency $f_2$ counted during the period $T_b$ with said reference value, means for producing a first signal when said number of impulses of $f_2$ counted during the period $T_b$ is less than said reference value and a second signal of opposite sign when said number of impulses of $f_2$ counted during said period $T_b$ is more than said reference value and means responsive to said first signal for increasing the frequency of said oscillator and responsive to said second signal for decreasing the frequency of said oscillator.

2. A combination according to claim 1, in which said comparator comprises a plurality of decade sealer counter units for counting said impulses of said frequency $f_2$ during said period $T_b$.

3. A combination according to claim 1, including means for multiplying the output frequency $f_2$ of said oscillator, said mixing means comparing said multiplied frequency with a function of the output frequency $f_1$ of said atomic frequency standard.

4. A combination according to claim 1, in which said preselecting means comprises means for presetting said digital counter for a preselected value, said digital counter producing an impulse when said preselected value is reached in counting said impulses of said frequency $f_2$.

5. A combination according to claim 4, in which said signal-producing means comprises means responsive to a comparison between said period $T_b$ with the time required by said counter to reach said preselected value in counting said impulses of said frequency $f_2$ to produce said first signal when said counter reaches said selected value after the end of said period $T_b$ and to produce said second signal when said counter reaches said selected value before the end of said period $T_b$.

6. A combination according to claim 4, including means comprising a delay line for resetting said counter to said preselected value a selected interval of time after completion of a count of said impulses of said frequency $f_2$.

7. A combination according to claim 1, in which said variable frequency oscillator comprises a quartz crystal controlled oscillator.

8. A combination according to claim 1, comprising means for dividing said beat frequency $f_b$ to produce a submultiple frequency having said period $T_b$.

9. A combination according to claim 8, in which said dividing means produces an output frequency having a period of the order of one second.

References Cited by the Examiner
UNITED STATES PATENTS

| | | | |
|---|---|---|---|
| 1,310,779 | 7/19 | Bryce | 58—24 |
| 1,310,780 | 7/19 | Bryce | 58—24 |
| 1,514,751 | 11/24 | Wold | 58—23 |
| 2,410,156 | 10/46 | Flory | 58—26 |
| 2,560,365 | 7/51 | Norton | 331—3 |
| 2,602,897 | 7/52 | Norton | 331—3 |
| 2,609,654 | 9/52 | Hershberger | 58—24 |
| 2,669,659 | 2/54 | Norton | 331—3 |
| 2,699,503 | 1/55 | Lyons et al. | 331—3 |
| 2,704,431 | 3/55 | Steele | 58—24 |
| 2,714,661 | 8/55 | Norton | 331—3 |
| 2,782,313 | 2/57 | Morrison | 331—2 |
| 2,802,943 | 8/57 | Hershberger | 331—3 |

LEYLAND M. MARTIN, Primary Examiner.